United States Patent [19]
Brown et al.

[11] 4,217,849
[45] Aug. 19, 1980

[54] MINE ROOF WARNING INDICATOR

[76] Inventors: Larry L. Brown, 2802 Corral Dr., St. Louis, Mo. 63010; Robert G. Hamm, 3905 Shenandoah, St. Louis, Mo. 63110

[21] Appl. No.: 971,879
[22] Filed: Dec. 21, 1978
[51] Int. Cl.² .................. F16B 31/02; G01L 5/00
[52] U.S. Cl. .................. 116/212; 73/761; 73/784
[58] Field of Search .......... 116/212, DIG. 34; 73/761; 85/62; 250/463, 483

[56] References Cited

U.S. PATENT DOCUMENTS

| | | | |
|---|---|---|---|
| 2,362,872 | 11/1944 | Weagle | 250/463 X |
| 2,725,843 | 12/1955 | Koshi | 116/212 |
| 3,111,655 | 11/1963 | Kotarsky et al. | 340/213 |
| 3,133,468 | 5/1964 | Cumming | 85/62 |
| 3,137,268 | 6/1964 | Hornwood | 340/213 |
| 3,179,082 | 4/1965 | McClean | 116/212 |
| 3,329,058 | 7/1967 | Cumming | 85/62 |
| 3,786,503 | 1/1974 | Webb et al. | 340/421 |
| 3,844,248 | 10/1974 | Parker | 116/212 X |
| 4,000,681 | 1/1977 | Coldren | 85/62 |
| 4,041,776 | 8/1977 | Payne | 116/DIG. 34 |

FOREIGN PATENT DOCUMENTS 1213734  5/1970  United Kingdom ........... 85/62

Primary Examiner—Daniel M. Yasich
Attorney, Agent, or Firm—Neal Kalishman

[57] ABSTRACT

A mine warning device which comprises tensioned arms that abut the roof of an underground mine. The arms support a cone shaped shaft which is attached to a warning indicator. The indicator remains invisible within the body of the device when the rocks forming the roof are stable. Upon a shifting of the mine roof, which applies pressure to the arms of the device, the shaft is released and the warning cylinder falls into view. Preferably, the device attaches to bolts that hold plates to the mine roof and the warning indicator is fluorescent.

13 Claims, 4 Drawing Figures

MINE ROOF WARNING INDICATOR

BACKGROUND OF THE INVENTION

I. Field of the Invention

The present invention is directed to a device which gives warning of the potential collapse of mine roofs. Specifically, the invention is concerned with a warning indicator that detects shifts in the ceiling of mines and provides warning thereof.

II. Description of the Prior Art

It is generally recognized that one of the most hazardous professions in modern society is that of being a miner. This is particularly true of those who work in underground coal mines. Not only is there serious health hazards, but many miners are killed or seriously injured by the collapse of the roofs of the mines. This problem has become so serious that new government mine safety regulations have been imposed.

There are several reasons why it has been impossible to develop a successful system that gives warning of impending cave-ins. A cave-in can potentially take place in any section of a mine. It is not unusual for a small mine to be composed of tunnels totalling over 25 miles. Thus, the area that must be monitored by any warning system is extremely extensive. Further, the tunneling system not only is not straight but does not maintain a constant elevation.

Several attempts have been made at developing warning devices which are suitable for use in mines. Emphasis has been placed on devices which utilize lights, visible chemical substances, and audio signals as warning devices. Examples of such devices are provided in U.S. Pat. Nos. 3,137,268, 3,111,655, and 3,786,503. Each of these devices requires constant maintenance and testing in order to insure that the devices are in operating condition. Due to the large number of devices which must be utilized in a mine, an expensive maintenance and testing program must be implimented. Such maintenance and testing programs are prohibitively expensive. Also, these devices are ineffective in areas of the mine which are only sporadically worked and in those situations where the device has already sounded its warning and no one was in the area to either see or hear it. The miners who later enter the area are totally unaware of the device's warning if the power source for the warning device has been exhausted.

There are other mechanical indicators, such as described in U.S. Pat. No. 2,725,843, which do not suffer the problems associated with an electrically operated warning device, however, these devices usually comprise plates which are bent by the sagging mine roof. In order to derive a warning from these devices each device must be constantly carefully examined to determine whether rock movement has occurred. Invariably these devices are not continually inspected nor closely monitored and therefore are of no value. Due to the number of warning units contained in a mine the type of monitoring program needed to make such a device effective is extremely expensive and so unfeasible.

The present invention is advantageous in that it provides a mine roof warning device which demonstrates high reliability and is inexpensive to construct. The device requires no maintenance and is simple to install on existing roof plates. Advantageously, the device does not utilize electrical systems and provides a visible warning signal which remains activated for indefinite periods. The mechanism does not require maintenance, testing, nor constant surveillance. The warning indicator is sensitive to the most minor movements of the rock layers above the mine.

SUMMARY OF THE INVENTION

The present invention provides a mine warning device comprising a means for attachment of the device to the roof of a mine, a compression arm means, a compression activation means, and an indicator means which indicates the movement of the mine roof. The compression arm means detects movement of the mine roof and upon movement of the compression arm means the indicator means is displayed due to the compressioned activation means.

DESCRIPTION OF THE PREFERRED EMBODIMENTS

The present invention is directed to a mine roof warning indicator which indicates when the potential exists for the roof of the mine to cave in. The mechanism is advantageously attached to the head of a roof bolt which usually extends from the roof plates that are located throughout the interior of the mine. Normally, at approximately seven foot intervals within an underground mine there are roof plates which are bolted into the ceiling rock wall. These plates serve to support the ceiling of the mine. The plates have a bolt head extending from the plate. The mechanism of the present invention is suitable for attachment to these bolt heads. However, the mechanism of the invention can be attached independently to the ceiling of the mine or to another piece which is displaced upon movement of the mine ceiling.

Figure 1:
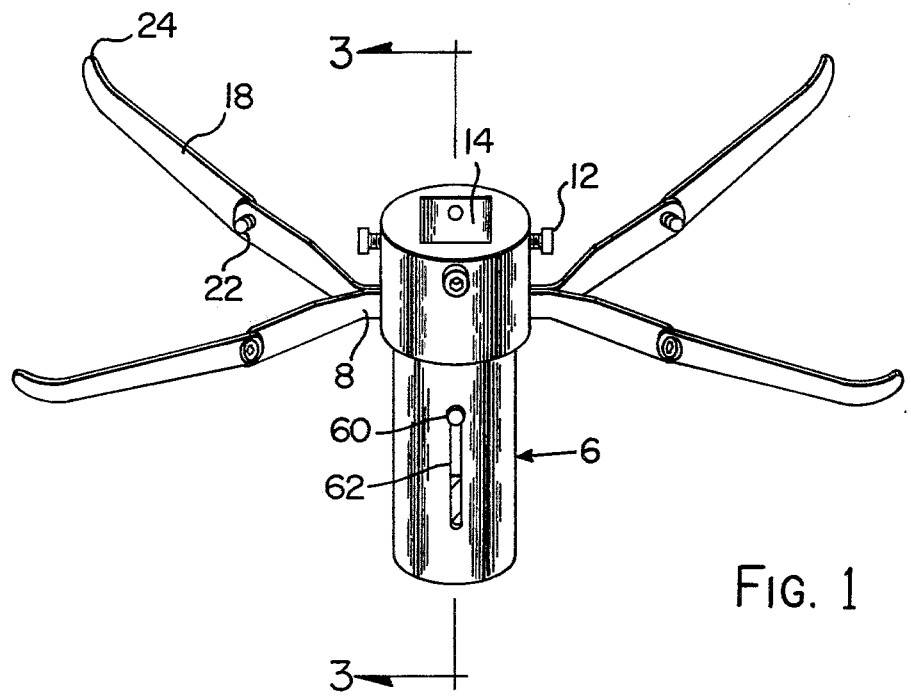
FIG. 1 is a prospective view of the mine roof warning indicator of the present invention.
Figure 2:
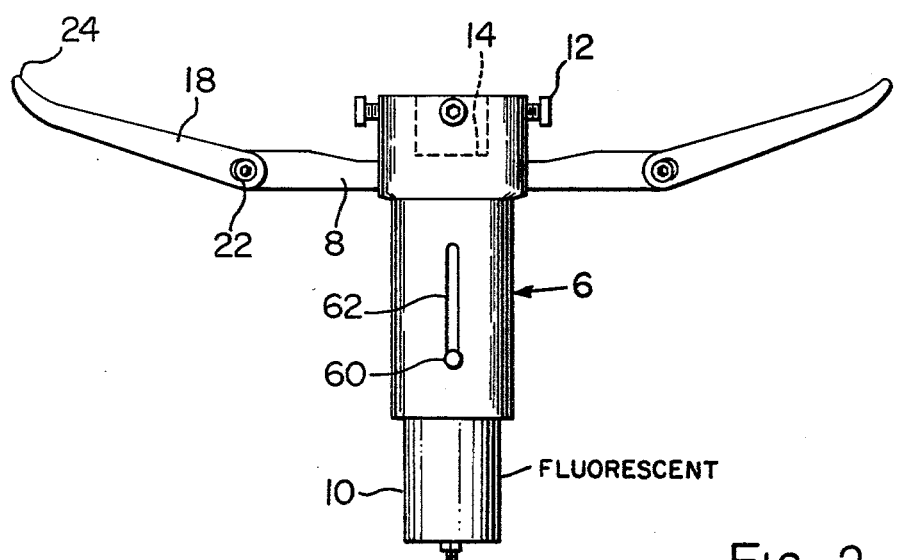
FIG. 2 is a prospective view of the mine roof warning indicator of the present invention with the indicator means in the danger warning position.
Figure 3:
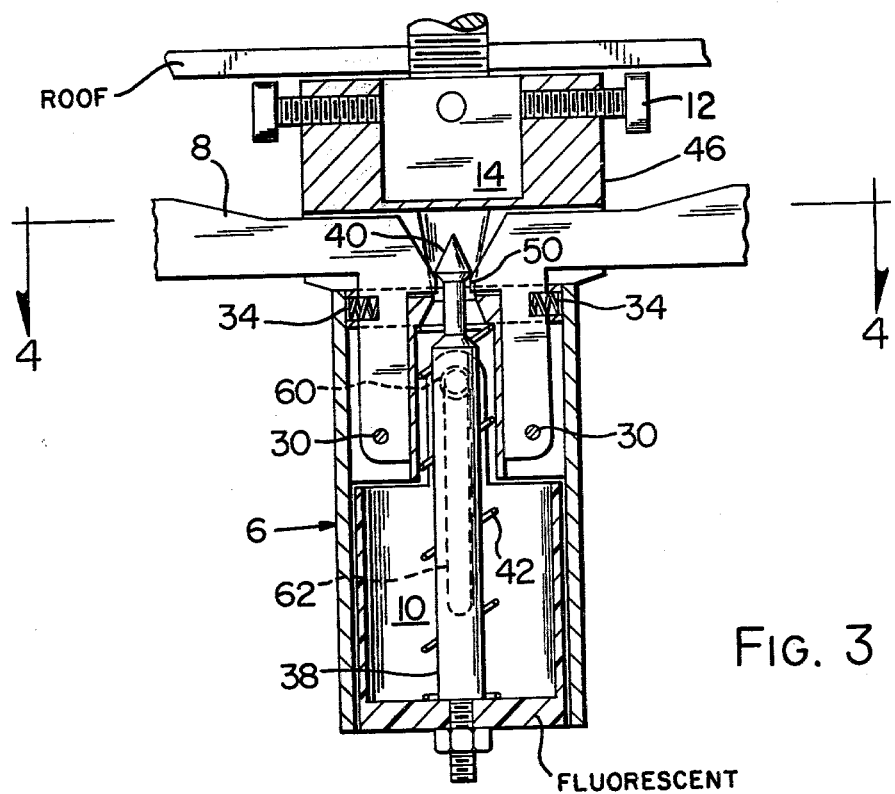
FIG. 3 is a sectional view through line 3—3 of FIG. 1 of the mine warning indicator of the present invention.
Figure 4:
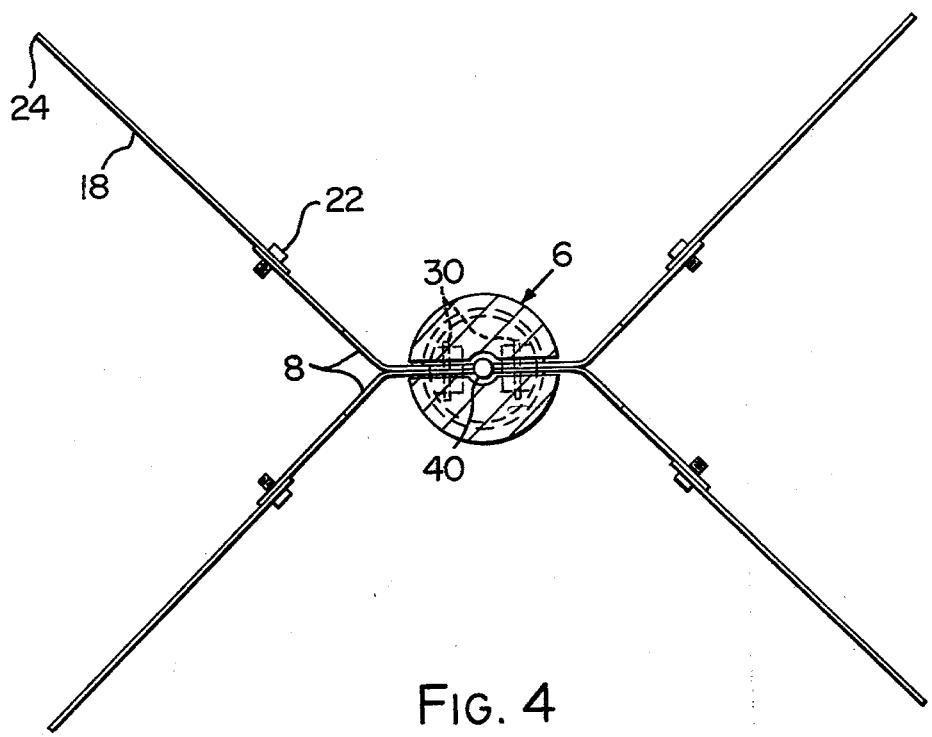
FIG. 4 is a sectional view through line 4—4 of the mine roof indicator of FIG. 3 of the present invention.

As shown in FIGS. 1, 2, 3, and 4 the indicator device is comprised of a body 6, arms 8, and warning flag or cylinder 10. The body may be made from either metal or plastic as may the arms and warning cylinder.

The device is mounted through a mounting means to a ceiling bolt, attaching means, by screws 12. The body of the device has an aperture 14 which is shaped to mate with the shape of the ceiling bolt or to whatever the device is attached. Protruding into the aperture are screws 12 which when tightened secure the device to the bolts. This allows for easy installation of the device and simple removal of the device when a section of a mine is abandoned.

The arms 8 are designed so that they make contact or communicate with the ceiling plate or roof of the mine. Preferably two arms are employed, each with two fingers 24. By use of such a design each of the quadrants of a plate can be monitored. The fingers are in two sections so that the upper section 18 can be adjusted by screw 22 to insure that the fingers 24 tightly abut the ceiling plate. The lower portions of the arms are attached to the body through screws 30 which allow the arm lateral movement. The outwardly extending position of the arms is maintained by springs 34. Thus, forming a compressioned arm means. Alternatively, each of the fingers 24 can have a plate attached to them in order to alleviate the necessity for their to be plates attached to the mine roof.

The device has a center shaft 38 which serves as an activation or actuation means. The shaft 38 has a cone shaped head 40. Surrounding the shaft is a spring 42. One end of the center shaft and spring are secured to the bottom of the inside of the warning cylinder 10. The opposite end of the spring abuts partition 46. Instead of a spring the warning cylinder could be weighted.

The warning cylinder or indicator means is preferably circular in shape as is the body of the device. It is preferable that the cylinder be fluorescently colored. The warning cylinder has a set of screws 60 attached to its side wall. The side wall of the body of the device has slits 62 through which the screws protrude. The slits maintain the position of the warning cylinder 10 and prevent it from separating from the body of the device when the warning cylinder 10 and shaft 38 are not being supported by the arms 8 and are in the devices warning made.

The operation of the mechanism is relatively simple. The mechanism following attachment to the roof of the mine, preferably through bolts, is "loaded" by pushing the warning cylinder within the cavity of the body 6. The cone shaped or tapered shaft 38 is supported by the ends 50 of the arms. The fingers are then adjusted by screw 22 so that they abut the mine roof or a plate attached to the mine roof. If no movement occurs in the rock layers above the roof plate, then the warning cylinder remains within the cavity of the body of the mechanism.

When the roof plate or roof is displaced or moves due to the rock movement in the roof of the mine, the arms 8 of the device are also moved. The arms 8 of the device follow the movement of the plate and thus pivot away from the cone shaped head of the central shaft. The amount of pressure necessary to cause movement of the arms 8 will depend upon the size of springs 34 which are utilized. Preferably, the springs 34 should allow arm movement when greater than four pounds of pressure are applied to the arms 8. The shaft 38 which is no longer supported by the arms 8 and the spring 42 and gravity force the warning cylinder or insert downward and outside of the body cavity. If any miners are in the area or later enter the area where the device is located, their helmet lights will reflect off of the fluorescent warning cylinder. Thereby, alerting the miners that there may be a potential danger of a cave-in in the area. After the mine roof is resecured, the mechanism can be "reloaded" by pushing the warning cylinder 10 within the cavity of the body 6 for further monitoring. The number of times that the mechanism can be revised is unlimited. Also, it can be moved by simply unscrewing screw 12 from the roof bolt and readjusting the arms to correspond to the ceiling of the new location.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. An underground mine warning device comprising a means for mounting the device upon an attaching meaning contained on the roof of a mine; outwardly extending compressioned arm means for detecting movement of a mine roof which are in communication with said mine roof; activation means for displaying an indicator means upon movement of said compressioned arm means; and on indicator means which indicate movement of said compressioned arm means.

2. The device of claim 1 wherein said device communicates to the mine roof through at least one flat plate.

3. The device of claim 1 wherein said means for mounting the device upon an attaching means contained on the roof of a mine comprises an aperture within the body of the device which is shaped to mate with a bolt head and at least two screws for maintaining a bolt head within said aperture.

4. The device of claim 1 wherein said compressioned arm means comprises at least two arm and spring sets.

5. The device of claim 4 wherein said arms comprise at least two fingers.

6. The device of claim 5 wherein said fingers are adjustable.

7. The device of claim 4 wherein said springs are at least four pound springs.

8. The device of claim 4 wherein the ends of said arms form a circle within the device and when no pressure is applied to said arms they support a shaft bearing a cone shaped head.

9. The device of claim 1 wherein said activation means comprises a shaft bearing a cone shaped head.

10. The device of claim 9 wherein said shaft is within a spring.

11. The device of claim 10 wherein said shaft and spring is attached to said indicator means.

12. The device of claim 1 wherein said indicator means comprises a fluorescent cylinder.

13. An underground mine warning device comprising a bolt inserted within the mine roof; an aperture within the body of the device which is shaped to mate with said bolt and at least two screws for maintaining the bolt within the aperture; outwardly extending compressioned arm means for detecting movement of the mine roof which are in communication with said mine roof; and activation means for displaying a fluorescent cyclinder upon movement of said compressioned arm means.

* * * * *